(12) United States Patent
Kim

(10) Patent No.: US 11,766,964 B2
(45) Date of Patent: Sep. 26, 2023

(54) VEHICLE LAMP

(71) Applicant: HYUNDAI MOBIS CO., LTD., Seoul (KR)

(72) Inventor: Seok Huyn Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/863,521

(22) Filed: Jul. 13, 2022

(65) Prior Publication Data

US 2023/0024927 A1    Jan. 26, 2023

(30) Foreign Application Priority Data

Jul. 26, 2021 (KR) .......................... 10-2021-0097955

(51) Int. Cl.
| | |
|---|---|
| *B60Q 1/068* | (2006.01) |
| *F21S 41/675* | (2018.01) |
| *F21S 41/657* | (2018.01) |
| *F21S 41/365* | (2018.01) |
| *F21S 41/32* | (2018.01) |
| *F21S 43/31* | (2018.01) |
| *F21S 43/37* | (2018.01) |

(52) U.S. Cl.
CPC ............ *B60Q 1/068* (2013.01); *F21S 41/321* (2018.01); *F21S 41/365* (2018.01); *F21S 41/657* (2018.01); *F21S 41/675* (2018.01); *F21S 43/31* (2018.01); *F21S 43/37* (2018.01)

(58) Field of Classification Search
CPC ...... F21S 41/675; F21S 41/657; F21S 41/663; F21S 41/365; F21S 43/31; F21S 43/37; B60Q 1/068
See application file for complete search history.

(56) References Cited

U.S. PATENT DOCUMENTS

| | | | | |
|---|---|---|---|---|
| 8,496,365 | B2 * | 7/2013 | Singh ................... | B60Q 1/0041 362/546 |
| 2014/0063834 | A1 * | 3/2014 | Guan ..................... | F21S 41/657 362/523 |
| 2017/0174121 | A1 * | 6/2017 | Wasilewski .............. | B60Q 1/04 |
| 2020/0173622 | A1 * | 6/2020 | Fritzon .................... | B60Q 1/05 |
| 2021/0140602 | A1 * | 5/2021 | Youn ...................... | F21S 41/657 |

FOREIGN PATENT DOCUMENTS

KR    20150127385 A   * 11/2015

* cited by examiner

*Primary Examiner* — Erin Kryukova
(74) *Attorney, Agent, or Firm* — NovoTechIP International PLLC

(57) ABSTRACT

The present disclosure relates to a vehicle lamp, and a vehicle lamp according to the present disclosure includes a first optical module that forms a first light distribution pattern using light irradiated from a first light source device, a second optical module that forms a second light distribution pattern using light irradiated from a second light source device, a third optical module that forms a third light distribution pattern using light irradiated from a third light source device, a movement part that is connected to the first light source device and moves the first light source device, a rod part connected to the second light source device and interlocked with the movement part to rotate the second light source device, and a driving part that provides a driving force to the movement part and the rod part.

13 Claims, 11 Drawing Sheets

VEHICLE LAMP

CROSS-REFERENCE TO RELATED APPLICATIONS

This application claims the benefit of priority to Korean Patent Application No. 10-2021-0097955, filed in the Korean Intellectual Property Office on Jul. 26, 2021, the entire content of which is incorporated herein by reference.

BACKGROUND

1. Technical Field

The present disclosure relates to a vehicle lamp, and more particularly, to a vehicle lamp capable of implementing various lamp images.

2. Discussion of Related Art

In general, vehicles are provided with various types of lamps having a lighting function for easily identifying an object located around a vehicle during night driving and a signal function for notifying other vehicles or road users of a driving state of the vehicle.

Examples of vehicle lamps include head lamps (headlights) and fog lamps mainly for the purpose of lighting functions and turn signal lamps, tail lamps, brake lamps, side markers and the like for the purpose of signal functions, and installation standards and specifications of these vehicle lamps are regulated by laws and regulations so that the respective functions are fully exhibited. In recent years, differentiation of design elements of the vehicle lamp in addition to a device for irradiating light of the vehicle lamp or a device for notifying the outside of a signal has also been emphasized. Accordingly, the vehicle lamps equipped with various light sources having matrix types have been developed.

However, the vehicle lamp according to the related art forms a static lamp image using a light source installed in a fixed structure and thus has a limitation in expressing various designs using distributed images. Thus, improvement of a technology is required so that various lamp images in addition to the static lamp image implemented through simple lighting of the light sources are implemented to provide improved visual effects in terms of design.

SUMMARY

The present disclosure has been made to solve the above-mentioned problems occurring in the prior art while advantages achieved by the prior art are maintained intact.

An aspect of the present disclosure provides a vehicle lamp in which an image of an entire light distribution pattern is three-dimensionally and dynamically converted to implement lamp images having various designs.

Another aspect of the present disclosure provides a vehicle lamp that may improve the total quantity of light and accordingly improve visibility especially in bad weather to ensure vehicle stability.

According to an aspect of the present disclosure, there is provided a vehicle lamp including a first optical module that forms a first light distribution pattern using light irradiated from a first light source device, a second optical module that forms a second light distribution pattern using light irradiated from a second light source device, a third optical module that forms a third light distribution pattern using light irradiated from a third light source device, a movement part that is connected to the first light source device and moves the first light source device, a rod part connected to the second light source device and interlocked with the movement part to rotate the second light source device, and a driving part that provides a driving force to the movement part and the rod part, wherein the light irradiated from the third light source device is emitted to an outside in a state in which the first light source device is moved and the second light source device is rotated.

A lamp image that is a beam pattern formed by the first light distribution pattern, the second light distribution pattern, and the third light distribution pattern may be converted by the movement part and the rod part.

The lamp image may include a first mode image including the first light distribution pattern and the second light distribution pattern in an initial state, and a second mode image including the first light distribution pattern, the second light distribution pattern, and the third light distribution pattern in a state in which the first light source device is moved and the second light source device is rotated.

The driving part may include a driving shaft that moves forward or rearward by the driving force, and the movement part may include a retainer coupled to the driving shaft, a retainer holder having one side coupled to the retainer and the other side from which a movement rod having a lengthwise direction corresponding to a central axis of the driving shaft extends, a main bezel in which the first light source device is installed and which is fixed to one end of the movement rod, and a movement plate having a through-hole through which the movement rod passes and spaced apart from a lower portion of the main bezel.

The vehicle lamp according to the present disclosure further includes a first base plate provided below the second light source device, wherein the first base plate further includes a body having a through-hole through which the movement rod passes, a plurality of hinge couplers formed along a circumference of the through-hole in the body, and rod insertion grooves concavely formed on a lateral side of the body at locations corresponding to the hinge couplers.

Further, the vehicle lamp according to the present disclosure further includes a second base plate provided below the movement plate, wherein the second base plate includes a body having a through-hole through which the movement rod passes, and a plurality of rod couplers formed along a circumference of the body in the body.

The retainer holder may include a body coupled to the retainer, and a presser that extends in a horizontal direction along the circumference of the body and presses the body of the second base plate upward when the driving shaft moves forward.

The rod part may include a rotation bezel on which the second light source device is mounted and which is hinge-coupled to the hinge coupler and is rotatably mounted on the first base plate, and a rod member having one end hinge-coupled to the rotation bezel and the other end hinge-coupled to the rod coupler and inserted into the rod insertion groove.

The plurality of rotation bezels may be provided along a circumference of the main bezel, and rotation angles of the rotation bezels may be varied by the driving part, and the number of the rod members may correspond to the number of the rotation bezels.

The third light source device may be installed on a rear surface of the main bezel facing the movement plate, and the third optical module may further include a reflector installed in the movement plate to reflect the light irradiated from the third light source device.

The light reflected through the reflector may be reflected through the rotation bezel, and the rotation bezel is coated with a reflective material to reflect the light reflected by the reflector to the outside.

The vehicle lamp according to the present disclosure further includes a plurality of fourth optical modules that form a fourth light distribution pattern using light irradiated from a fourth light source device and are arranged along a circumference of the first optical module, and a sub-bezel on which the fourth optical modules are mounted.

The first base plate may further include a bezel fixer which is arranged between the hinge couplers adjacent to each other and to which the sub-bezel is fixed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings.

First, the embodiments described below are embodiments suitable for understanding technical features of a vehicle lamp according to the present disclosure. However, the present disclosure is not limited to the embodiments described below, the technical features of the present disclosure are not limited by the described embodiments, and various modifications may be made within the technical scope of the present disclosure.

Figure 1:
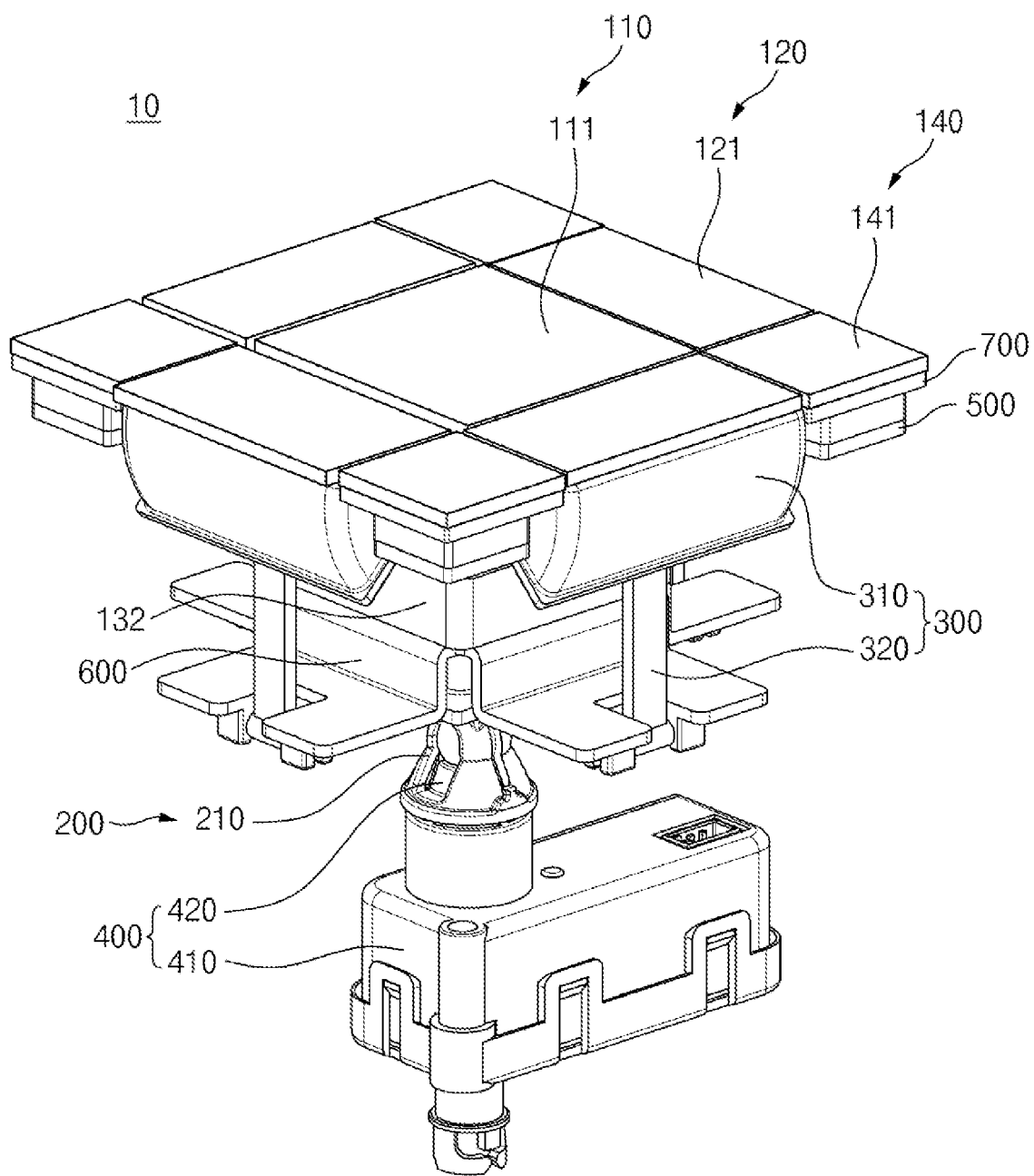
FIG. 1 is a perspective view illustrating a vehicle lamp according to an embodiment of the present disclosure.
Figure 2:
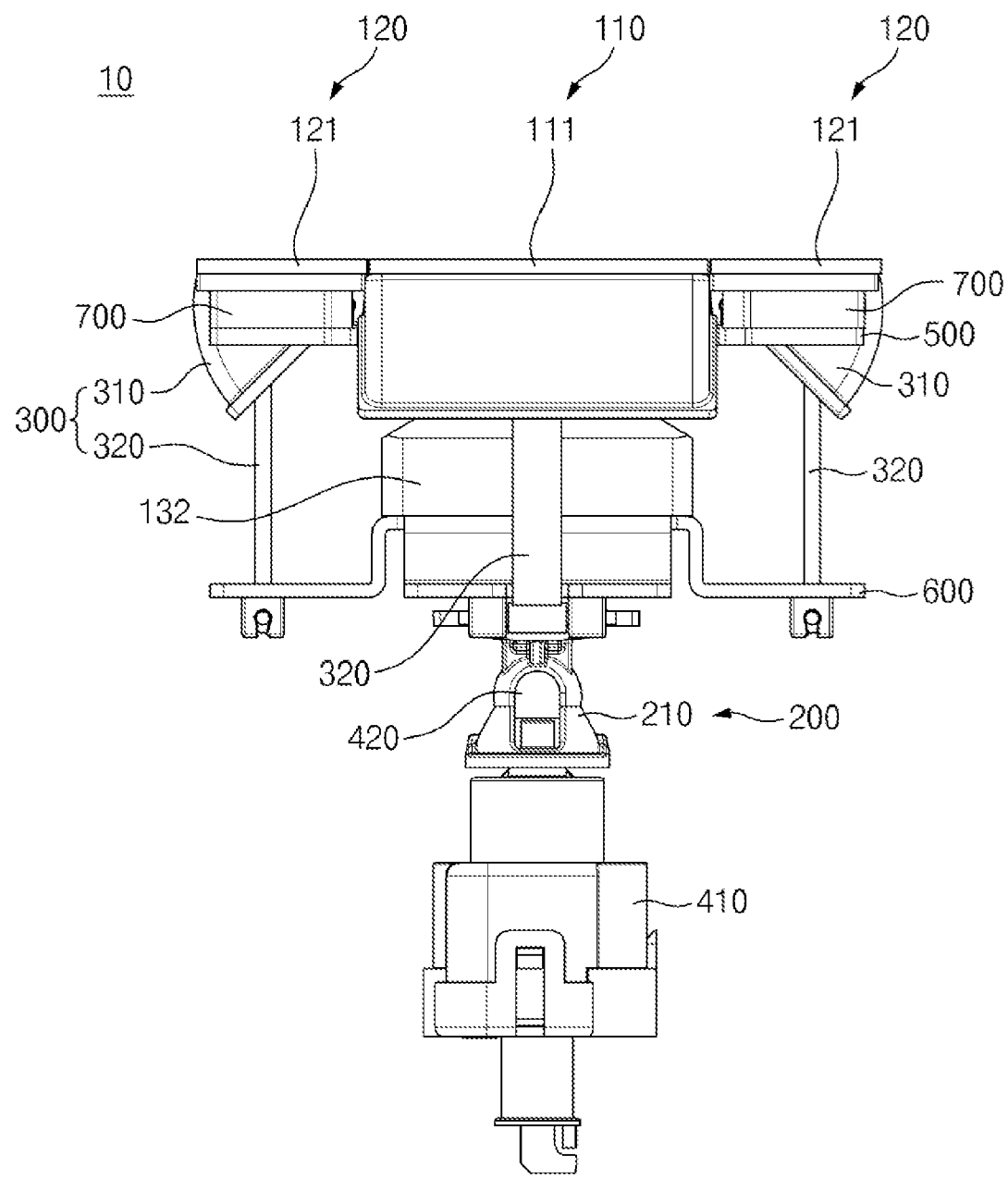
FIG. 2 is a front view illustrating a front surface of the vehicle lamp according to the embodiment of the present disclosure.
Figure 3:
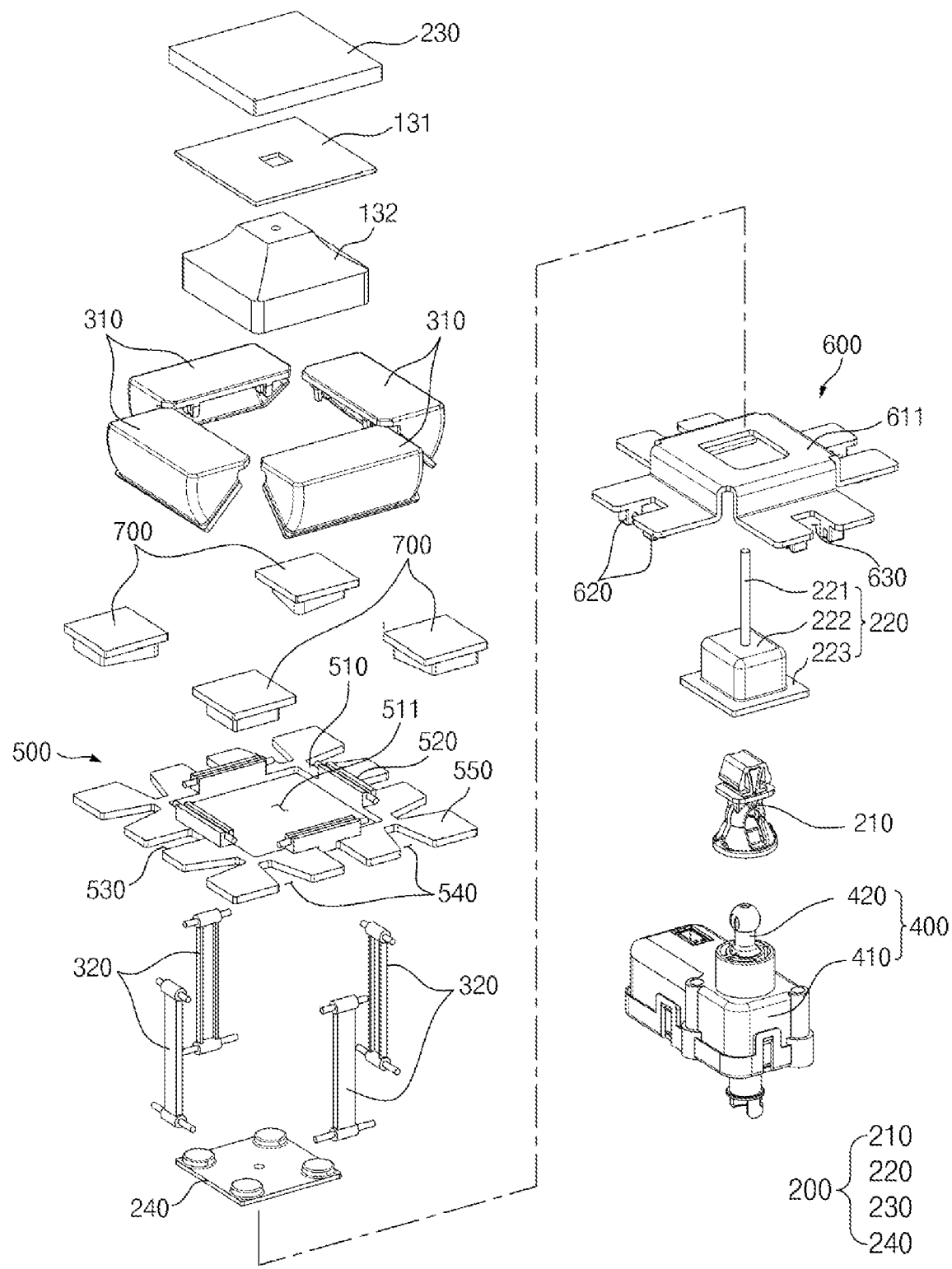
FIG. 3 is an exploded perspective view illustrating a state in which the vehicle lamp illustrated in FIG. 1 according to an embodiment of the present disclosure is disassembled.
Figure 4:
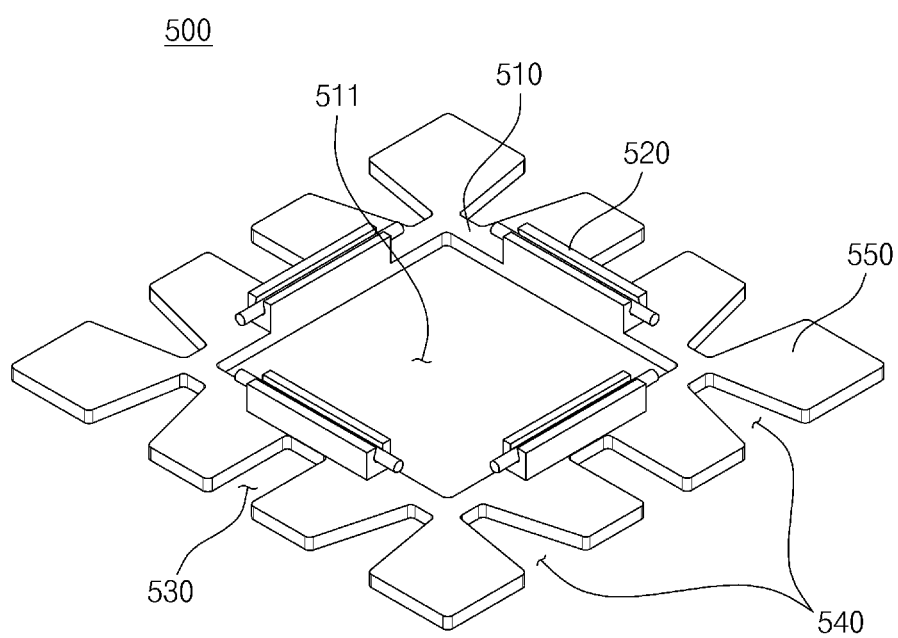
FIG. 4 is a perspective view illustrating a first base plate according to an embodiment of the present disclosure.
Figure 5:
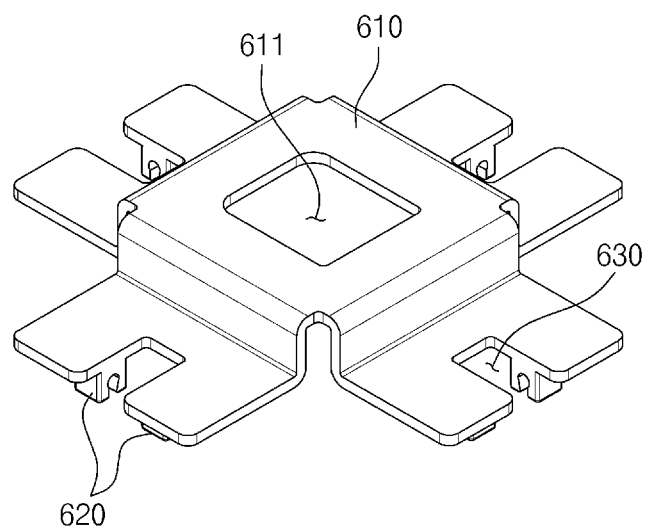
FIG. 5 is a perspective view illustrating a second base plate according to an embodiment of the present disclosure.
Figure 6:
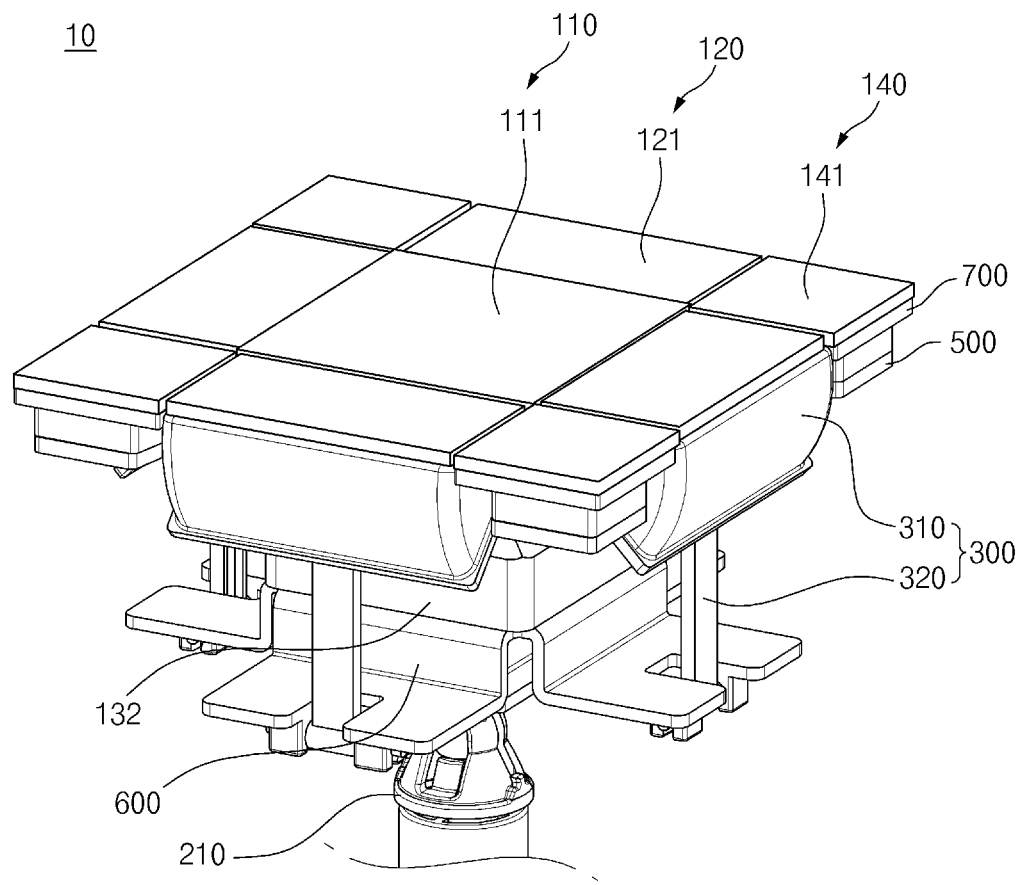
FIG. 6 is a perspective view illustrating a part of FIG. 1.

FIG. 1 is a perspective view illustrating a vehicle lamp according to an embodiment of the present disclosure, FIG. 2 is a front view illustrating a front surface of the vehicle lamp according to the embodiment of the present disclosure, FIG. 3 is an exploded perspective view illustrating a state in which the vehicle lamp illustrated in FIG. 1 according to an embodiment of the present disclosure is disassembled, FIG. 4 is a perspective view illustrating a first base plate according to an embodiment of the present disclosure, FIG. 5 is a perspective view illustrating a second base plate according to an embodiment of the present disclosure, and FIG. 6 is a perspective view illustrating a part of FIG. 1.

Figure 7:
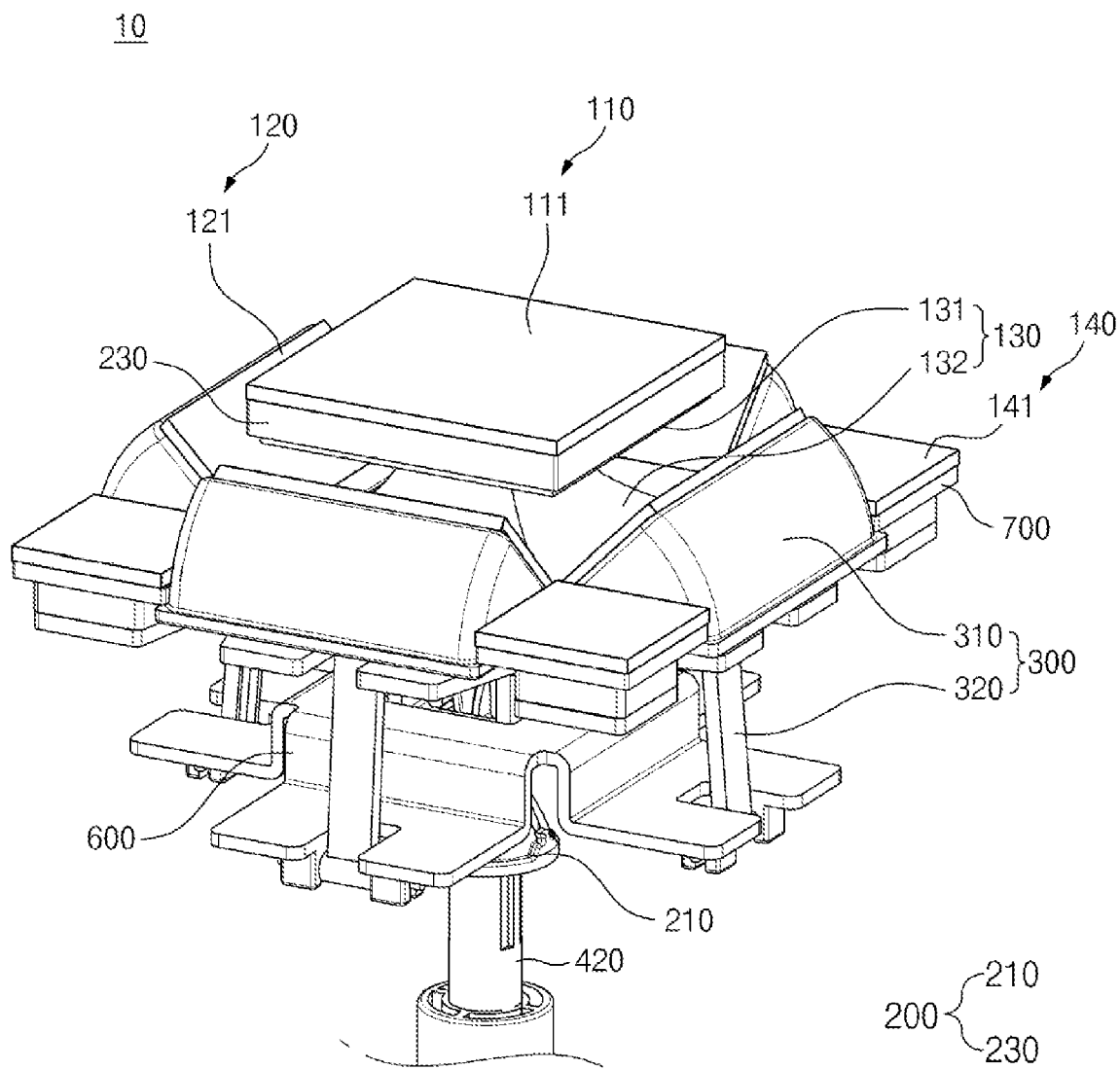
FIG. 7 illustrates an operation of the vehicle lamp according to an embodiment of the present disclosure and illustrates a state in which a movement part and a rod part in FIG. 6 are operated.
Figure 8:
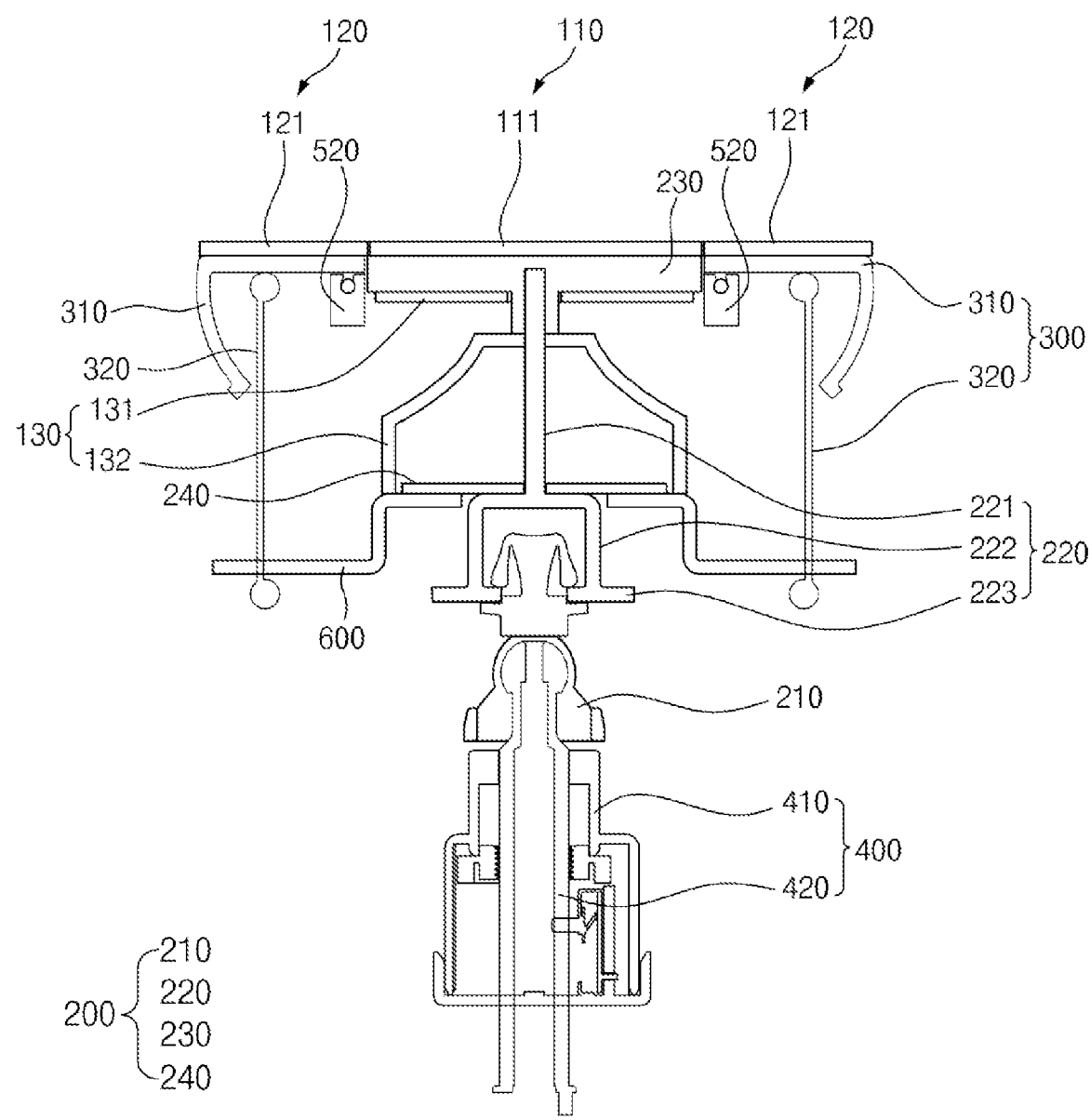
FIG. 8 is a cross-sectional view illustrating a cross-section of the vehicle lamp according to an embodiment of the present disclosure.
Figure 9:
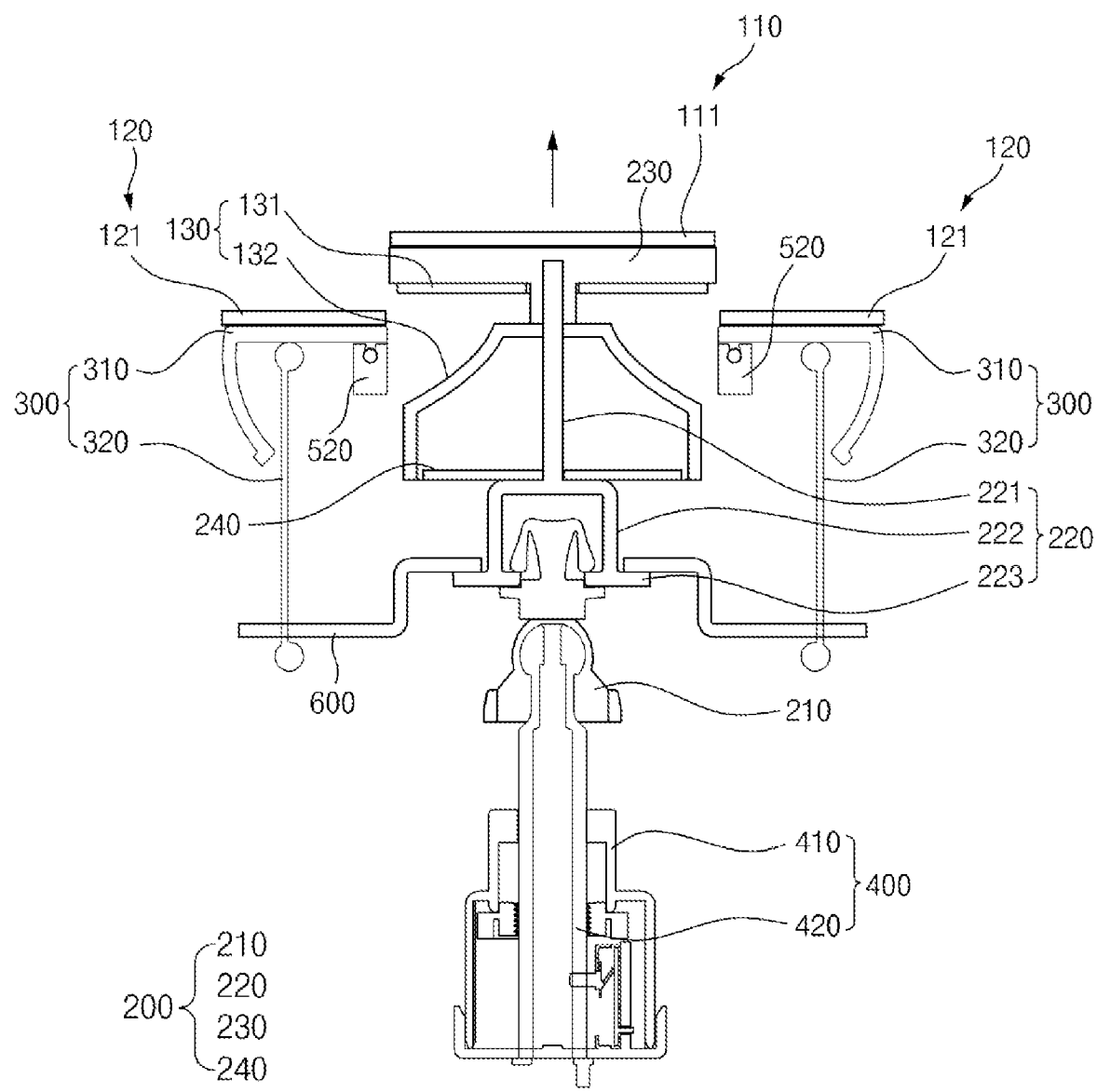
FIG. 9 is a cross-sectional view illustrating a state in which the movement part in FIG. 8 is moved.
Figure 10:
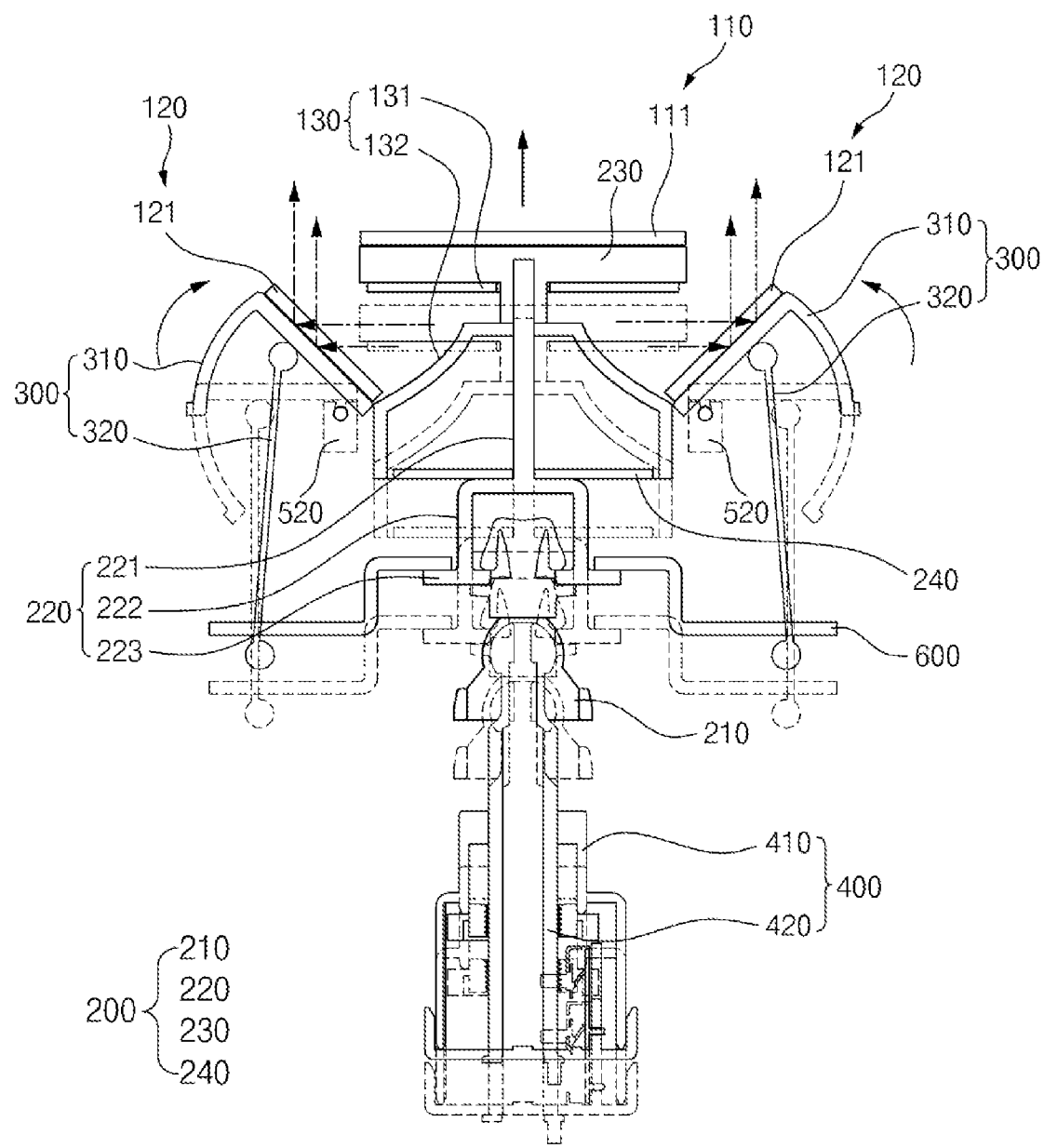
FIG. 10 is a cross-sectional view illustrating a state in which the rod part in FIG. 9 is moved.
Figure 11:
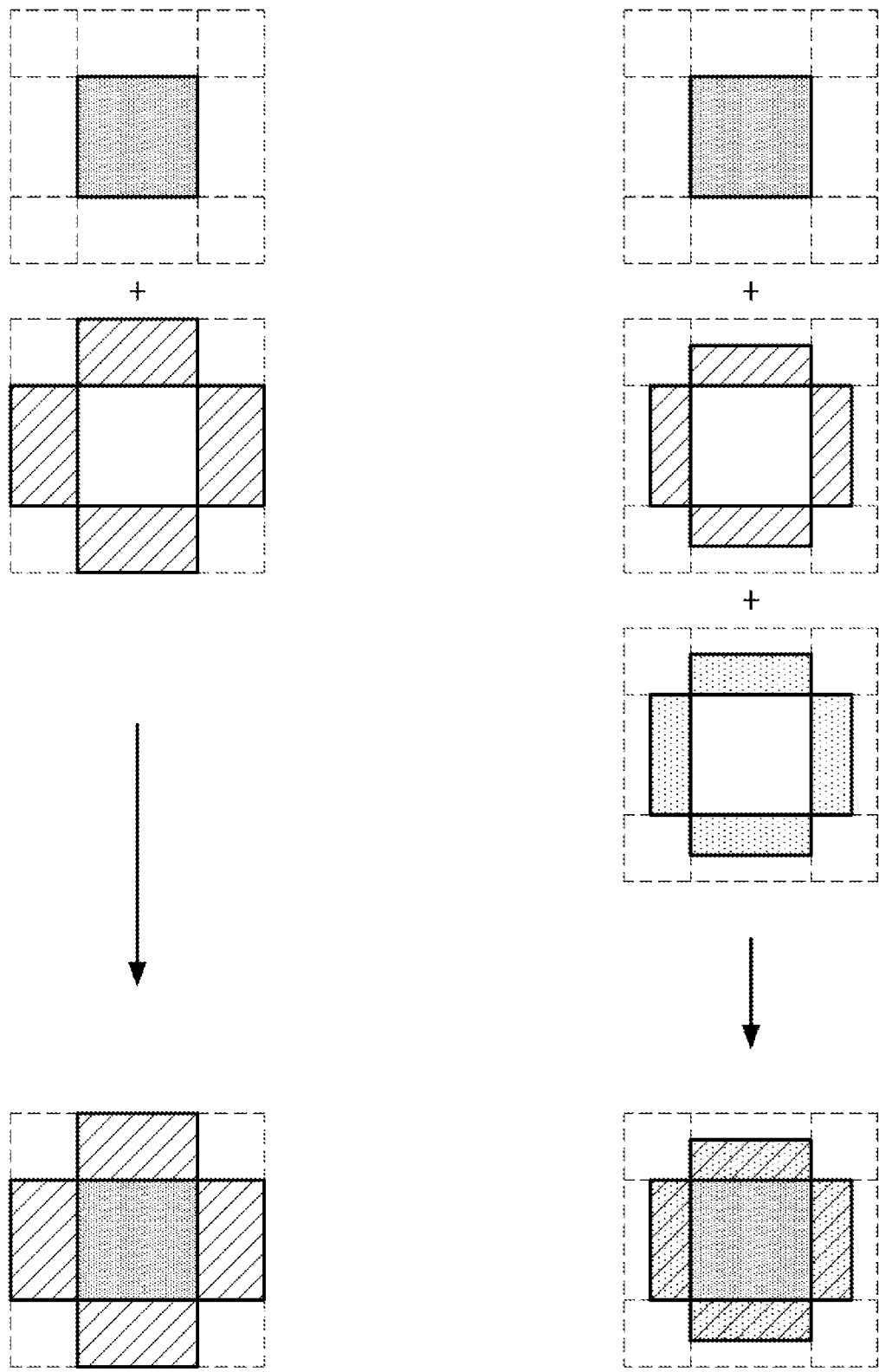
FIG. 11 illustrates first, second and third light distribution patterns generated by the vehicle lamp, a lamp image and converted lamp image generated based on the light distribution patterns, and first and second mode images included in the lamp image.

FIG. 7 illustrates an operation of the vehicle lamp according to an embodiment of the present disclosure and illustrates a state in which a movement part and a rod part in FIG. 6 are operated, FIG. 8 is a cross-sectional view illustrating a cross-section of the vehicle lamp according to an embodiment of the present disclosure, FIG. 9 is a cross-sectional view illustrating a state in which the movement part in FIG. 8 is moved, and FIG. 10 is a cross-sectional view illustrating a state in which the rod part in FIG. 9 is moved. FIG. 11 illustrates first, second and third light distribution patterns generated by the vehicle lamp, a lamp image and converted lamp image generated based on the light distribution patterns, and first and second mode images included in the lamp image.

Referring to FIGS. 1 to 10, a vehicle lamp 10 according to an embodiment of the present disclosure may include a first optical module 110, a second optical module 120, a third optical module 130, a movement part 200, a rod part 300, and a driving part 400.

The first optical module 110 is provided to form (or generate) a first light distribution pattern using light irradiated from a first light source device 111. An example of the first light distribution pattern is shown in FIG. 11.

In detail, the first optical module 110 may include the first light source device 111, and the first light source device 111 may include a first substrate and a plurality of first light sources mounted on the first substrate. For example, the first light sources may be provided as a light emitting diode (hereinafter, referred to as an LED), a micro LED, or the like, and the first substrate may be provided as a printed circuit board (PCB).

For example, the first substrate may be formed (or disposed) in a plate shape, and the plurality of first light sources may form a matrix shape and may be arranged on the first substrate along columns and rows. However, the present disclosure is not limited thereto, and the first light sources may be irregularly arranged on the first substrate. One or more first light sources may constitute a pixel of an individual unit. The first light sources may be turned on or off in units of pixels or the brightness and color of the first light sources may be adjusted, under control of a controller (not illustrated). Accordingly, the first light distribution pattern formed by the first optical module 110 may be output as various images having different shapes or as images having various brightness and colors. That is, the first light distribution pattern formed by the first optical module 110 may be converted into various images.

The second optical module 120 is provided to form a second light distribution pattern using light irradiated from a second light source device 121. An example of the second light distribution pattern is shown in FIG. 11. One or a plurality of second optical modules 120 may be provided around the first optical module 110. When the plurality of second optical modules 120 are provided, the second optical modules 120 may be moved integrally. Further, the second optical modules 120 may be moved independently from the first optical module 110.

In detail, the second optical module 120 may include the second light source device 121, and the second light source device 121 may include a second substrate and a second light source. The second light source device 121 may have the same configuration and structure as those of the first light source device 111. In detail, the second light source may form a matrix shape and may be arranged on the second substrate, and one or a plurality of second light sources may constitute individual units of pixels. The second light sources may be turned on or off in units of pixels or the brightness and color of the first light sources may be adjusted, under the control of the controller. Accordingly, the second light distribution pattern formed by the second optical module 120 may be converted into various images.

The third optical module 130 is provided to form a third light distribution pattern using light irradiated from a third light source device 131. An example of the third light distribution pattern is shown in FIG. 11. Here, the light irradiated by the third light source device 131 is emitted externally in a state in which the first light source device 111 is moved by the movement part 200 and the second light source device 121 is rotated by the rod part 300. That is, the third optical module 130 may be provided to irradiate light externally through dynamic conversion of the first optical module 110 and the second optical module 120.

Here, the first optical module 110, the second optical module 120, and the third optical module 130 may be individually turned on or off. That is, the first to third optical modules 110, 120, and 130 may be turned on or off independently of each other.

The movement part 200 is connected to the first light source device 111 and provided to move the first light source device 111. In detail, the movement part 200 may be coupled to the first light source device 111 and may linearly move the first light source device 111. Accordingly, the first light distribution pattern may implement a three-dimensional image.

The rod part 300 is connected to the second light source device 121 and interlocked with the movement part 200 to rotate the second light source device 121.

In detail, the rod part 300 may be configured to rotate the second light source device 121 and may be connected to a second base plate 600, which will be described below, and connected to the second light source device 121. That is, when the movement part 200 is operated to move the first light source device 111, the rod part 300 may be provided to rotate the second light source device 121 in connection with the movement.

The driving part 400 may provide or supply a driving force to the movement part 200 and the rod part 300.

In detail, the driving part 400 may be connected to the movement part 200 to move or reciprocate the movement part 200 forward or rearward. Further, as will be described below, when the movement part 200 moves, the driving part 400 may operate the second base plate 600 in connection with the movement to move the rod part 300. Accordingly, the driving part 400 may move the first optical module 110, and at the same time, rotate the second optical module 120.

When the dynamic conversion of the first optical module 110 and the second optical module 120 is performed by the driving part 400, the light irradiated from the third light source device 131 may be provided to be irradiated externally due to this dynamic conversion. That is, the third light distribution pattern formed by the third optical module 130 may be included in a lamp image of the vehicle lamp according to the present disclosure in a state in which the first light source device 111 is moved and the second light source device 121 is rotated. In this case, as the light from the third light source device 131 is added, the total quantity of the light irradiated by the vehicle lamp 10 may be increased.

In this way, the lamp image, which is the entire beam pattern formed by the first light distribution pattern, the second light distribution pattern, and the third light distribution pattern, may be converted by the movement part 200 and the rod part 300. For example, the respective optical modules may be individually turned on or off as described above, and when the movement part 200 and the rod part 300 are not driven, the lamp image may be formed by the first light distribution pattern and the second light distribution pattern. Further, when the movement part 200 and the rod part 300 are driven, the entire lamp image may be implemented by the first light distribution pattern and the third light distribution pattern or implemented by the first to third light distribution patterns. An example of the lamp image and converted lamp images is shown in FIG. 11.

According to the vehicle lamp 10 according to an embodiment of the present disclosure, an image of the entire light distribution pattern may be dimensionally and dynamically converted by the movement part 200 and the driving part 400, and accordingly, lamp images having various designs may be implemented.

Further, according to the present disclosure, the total quantity of light may be increased as the light formed by the second optical module 120 is added through location adjustment of the first optical module 110 and the second optical module 120. Accordingly, in particular, visibility may be improved in bad weather to ensure vehicle stability.

Further, according to the present disclosure, since the movement part 200 and the rod part 300 are provided to be interlocked with each other using the one driving part 400, the driving part 400 is minimized, and thus manufacturing costs of the vehicle lamp 10 may be reduced, and the volume and weight thereof may be reduced.

Further, according to the present disclosure, when the location of the second optical module 120 is adjusted, the rod part 300, of which the number of components is minimized, is applied, and thus the manufacturing costs of the vehicle lamp 10 may be reduced, and the volume and weight thereof may be reduced.

Meanwhile, the vehicle lamp 10 according to the present disclosure may further include a fourth optical module 140. The plurality of fourth optical modules 140 may form a fourth light distribution pattern using light irradiated from a fourth light source device 141 and may be arranged around the first optical module 110.

In detail, the fourth optical module 140 may include the fourth light source device 141, and the fourth light source device 141 may include a fourth substrate and a plurality of fourth light sources mounted on the fourth substrate. For example, the fourth light sources may form a matrix shape and may be arranged on the fourth substrate along columns and rows. One or more fourth light sources may constitute a pixel of an individual unit.

The fourth light sources may be turned on or off in units of pixels or the brightness and color of the fourth light sources may be adjusted. Accordingly, the fourth light distribution pattern formed by the fourth optical module 140 may be converted into various images.

For example, the fourth optical modules 140 may be arranged around the first optical module 110 and arranged between the second optical modules 120 adjacent to each other. Further, the fourth optical module 140 may be maintained in a static state while a location thereof is not adjusted when the movement part 200 and the rod part 300 are driven, but the present disclosure is not limited thereto.

The lamp image, which is the entire beam pattern formed by the vehicle lamp 10 according to an embodiment of the present disclosure, may be roughly divided into a first mode image formed before the movement part 200 and the rod part 300 are operated and a second mode image formed by operating the movement part 200 and the rod part 300. An example of the first mode image and second image lamp images is shown in FIG. 11.

In an initial state, the first mode image may include the first light distribution pattern and the second light distribution pattern. Further, the first mode image may further include the fourth light distribution pattern.

In detail, the first mode image is an image formed in a static state in which the locations of the first optical module 110 and the second optical module 120 are not changed. As described above, the first light source device 111 and the second light source device 121 may convert the first mode image into various images even in a static state in which the first light source and the second light source are arranged on the substrate in a matrix shape. The first mode image may be an image formed by the vehicle lamp 10 in normal times and may be converted into various images by the vehicle lamp 10.

The second mode image may include the first light distribution pattern, the second light distribution pattern, and the third light distribution pattern in a state in which the first light source device 111 is moved and the second light source device 121 is rotated. Further, the second mode image may further include the fourth light distribution pattern.

In detail, the second mode image is an image in a state in which the locations of the first optical module 110 and the second optical module 120 are changed. The second mode image may be implemented as a three-dimensional image by operation of the first optical module 110 and the second optical module 120, and as the third light distribution pattern formed by the third optical module 130 is added, the quantity of light may be increased. Accordingly, the second mode image may be implemented when various images are needed or during bad weather such as rain and dense fog.

Meanwhile, hereinafter, detailed configurations of the movement part 200, the rod part 300, and the driving part 400 will be described.

The driving part 400 may include a housing 410, a driving motor (not illustrated) provided inside the housing 410, and a driving shaft 420 provided to receive a driving force of the driving motor to move forward or rearward. Accordingly, the driving shaft 420 may be provided to move forward or rearward from the housing 410 by the driving force of the driving motor. For example, the driving motor may be an actuator.

The movement part 200 may include a retainer 210, a retainer holder 220, a main bezel 230, and a movement plate 240.

The retainer 210 may be coupled to the driving shaft 420 and support the driving shaft 420 that reciprocate or moves forward or rearward while rotating. In detail, the retainer 210 may be coupled to an upper portion of the driving shaft 420 (with respect to an up-down direction of the drawing) and may be provided between the retainer holder 220 and the driving shaft 420.

The retainer holder 220 may include a movement rod 221, a body 222, and a presser 223.

Here, the movement rod 221 may have a rod shape, of which a lengthwise direction corresponds to the driving shaft 420. In detail, the movement rod 221 may protrude upward from an upper surface (with respect to the up-down direction of the drawing) of the body 222 of the retainer holder 220 facing the main bezel 230. Further, when the driving shaft 420 moves forward or rearward while extracted from or retracted into the housing 410, the movement rod 221 may move forward or rearward due to the movement of the retainer 210 coupled to the driving shaft 420 and the retainer holder 220 coupled to the retainer 210.

The body 222 is a part constituting a body of the retainer holder 220, one side of the body 222 may be coupled to the retainer 210, and the movement rod 221 may extend from the other side of the body 222.

For example, the body 222 may have an internal space into which the retainer 210 may be inserted and coupled. Further, an insertion hole (not illustrated) into which the retainer 210 may be inserted may be formed at a lower end (with respect to the up-down direction of the drawing) of the body 222. That is, the body 222 may have a box shape in which the insertion hole (not illustrated) is formed at a lower end thereof.

The presser 223 may extend in a horizontal direction along a circumference of the body 222 and may press a body 610 of the second base plate 600, which will be described below, in an upward direction when the retainer holder 220 moves in one direction (e.g., a forward direction).

For example, the presser 223 may extend in the horizontal direction along a circumference of a lower end of the body 222, come into contact with a lower end of the body 610 of the second base plate 600 when the driving shaft 420 moves forward, and then press and lift up the body 610 of the second base plate 600.

The main bezel 230 may have the first light source device 111 installed therein and may be fixed to the other end of the movement rod 221 in a lengthwise direction.

In detail, the main bezel 230 is a member for linearly moving the first light source device 111 and may be fixed to an upper end (with respect to a direction of the drawing) of the movement rod 221. For example, the main bezel 230 may be formed in a plate shape and may be vertically provided in the movement rod 221. The first light source device 111 may be installed on a surface facing the front side of the main bezel 230. The first optical module 110 may dynamically convert an image by movement of the main bezel 230.

The movement plate 240 may have a through-hole through which the movement rod 221 passes or extends and may be spaced apart from a lower portion of the main bezel 230. For example, the movement plate 240 may be formed in a plate shape and may be provided in parallel to the main bezel 230, but the present disclosure is not limited thereto. The movement plate 240 may be equipped with components of the third optical module 130.

Meanwhile, the vehicle lamp 10 according to the present disclosure may further include a first base plate 500 provided at a lower portion of the second light source device 121. The first base plate 500 may be mounted on a lamp housing (not illustrated).

The first base plate 500 may include a body 510, a hinge coupler 520, and a rod insertion groove 530.

The body 510 is a part constituting a body of the first base plate 500 and may have a through-hole 511 through which the movement rod 221 passes or extends. For example, the body 510 may be formed in a ring shape of which a central area is perforated.

The plurality of hinge couplers 520 may be formed in the body 510 and may be provided along a circumference of the through-hole 511. The rod insertion grooves 530 may be concavely formed on a lateral side of the body 510 at locations corresponding to the hinge couplers 520. For example, the hinge couplers 520 may protrude upward from the body 510, and the rod insertion grooves 530 may be concavely recessed in a direction of the through-hole 511 from a circumferential direction of the body 510. The numbers of the hinge couplers 520 and the rod insertion grooves 530 may correspond to the number of the second optical modules 120.

In addition, a plurality of rotation bezel insertion grooves 540 into which rotation bezels 310, which will be described below, are inserted may be formed along the circumferential direction of the body 510 in the first base plate 500. In detail, the rotation bezel insertion grooves 540 may be concavely formed on a lateral side of the body 510 at locations adjacent to the rod insertion grooves 530.

Here, the rotation bezel insertion grooves 540 may be formed in various shapes. For example, the rotation bezel insertion grooves 540 may have a shape in which a distance between opposite inner walls formed by the respective grooves increases as the inner walls approach the circumferential direction of the body 510. In this case, when the vehicle lamp 10 is assembled, interference between the rotation bezel insertion grooves 540 and the rotation bezels 310 is minimized, and thus the vehicle lamp 10 may be assembled more easily.

It is apparent that the shape of the rotation bezel insertion grooves 540 may be equally applied to the rod insertion grooves 530.

Meanwhile, the vehicle lamp 10 according to the present disclosure may further include the second base plate 600 provided at a lower portion of the movement plate 240.

The second base plate 600 may include a body 610 and a rod coupler 620.

The body 610 is a part constituting a body of the second base plate 600 and may have a through-hole 611 through which the movement rod 221 passes or extends. That is, the body 610 may be formed in a ring shape of which a central area is perforated.

Here, the size of the through-hole 611 may be larger than the size of the body 222 of the retainer holder 220 and smaller than the size of the presser 223 of the retainer holder 220 so that the body 610 may be pressed upward by the presser 223 of the retainer holder 220.

Meanwhile, the body 610 may be formed in a plate shape, but the present disclosure is not limited thereto.

For example, as illustrated in FIG. 5, the body 610 may have a multi-stage shape stepped in a vertical direction along a circumference of the through-hole 611. In this case, a difference in stress caused by the presser 223 and a rod member 320, which will be described below, is minimized, and thus torsion of the body 610 may be minimized.

Further, the body 610 may include a reinforcement rib installed to be perpendicular to the stepped surface formed in the body 610, and thus rigidity of the body 610 may be supplemented. Here, the reinforcement rib may be formed in various shapes such as a linear shape or a non-linear shape.

The plurality of rod couplers 620 may be formed in the body 610 and may be provided along the circumference of the through-hole 611. For example, the rod couplers 620 may protrude downward from the body 610, and the number of the rod couplers 620 may correspond to the numbers of the second optical modules 120 and the rod members 320.

Meanwhile, it is apparent that rod insertion grooves 630 formed concavely on the lateral side of the body may be formed at locations corresponding to the rod couplers 620 in the body 610. For example, the rod insertion grooves 630 may be recessed concavely in a direction of the through-hole 611 from the circumferential direction of the body 510. The numbers of the rod insertion grooves 630 may correspond to the number of the second optical modules 120. For example, as illustrated in FIG. 5, the rod couplers 620 may be provided on both sides of the body 610 in a circumferential direction of an area in which the rod insertion grooves 630 are formed.

Meanwhile, the rod part 300 may include the rotation bezel 310 and the rod member 320.

The rotation bezel 310 may be equipped with the second light source device 121, hinge-coupled to the hinge coupler 520, and thus rotatably mounted on the first base plate 500. The locations and number of the rotation bezels 310 may correspond to the locations and number of the second optical modules 120, and the second light source device 121 may be mounted on a surface of the rotation bezel 310, facing a front side that is a light irradiation direction. A hinge boss rotatably connected to the hinge coupler 520 may be formed in the rotation bezel 310, and the rotation bezel 310 may rotate about the hinge coupler 520.

Further, the rotation bezel 310 may have various shapes. For example, as illustrated in FIG. 8, a lateral portion (with respect to the up-down direction of the drawing) of the rotation bezel 310 may have a curved shape. In detail, the lateral portion of the rotation bezel 310 may be curved toward the inside of the vehicle lamp 10 as it goes downward.

The rod member 320 may have one end hinge-coupled to the rotation bezel 310 and the other end hinge-coupled to the rod coupler 620 of the second base plate 600 and may be inserted into the rod insertion grooves 530 and 630. In this case, hinge bosses rotatably connected to be hinge-coupled to the rotation bezel 310 and the rod coupler 620 may be formed at both ends of the rod member 320. Further, the number of the rod members 320 may correspond to the number of the rotation bezel 310 (see FIG. 8).

The rod member 320 may move upward together with the movement part 200 after the movement part 200 moves upward by a certain distance, the rod member 320 may press the rotation bezel 310 when the rod member 320 moves, the rotation bezel 310 may rotate so that the third light source device 131 is exposed, and thus the quantity of the light of the vehicle lamp 10 may be increased.

Hereinafter, an operation method for the rod part 300 will be described in detail.

The rod member 320 is connected to the second base plate 600 and thus moves together with the movement of the second base plate 600. However, since the presser 223 of the retainer holder 220 and the body 610 of the second base plate 600 are spaced apart from each other by a predetermined distance, the rod member 320 is maintained in a stop state before the movement part 200 is moved by a predetermined distance or more, that is, until the presser 223 of the retainer holder 220 comes into contact to the lower end of the body 610 of the second plate 600 (see FIGS. 8 and 9).

After the movement part 200 is moved by a predetermined distance or more, that is, after the presser 223 of the retainer holder 220 comes into contact with the lower end of the body 610 of the second base plate 600, the presser 223 pushes up the body 610, and thus the rod member 320 moves upward together with the second base plate 600 that is pressed and moved upward.

As the rod member 320 moves upward, the rod member 320 may press the rotation bezel 310. In detail, the rod member 320 is hinge-coupled to the rotation bezel 310 and the rod coupler 620 and thus may rotate and be inclined toward the center of the vehicle lamp 10, and the rotation bezel 310 may be rotated about the hinge coupler 520 by being pressed by the rod member 320 (see FIG. 10).

Accordingly, the movement of the movement part 200 and the rotational operation of the rod part 300 may be interlocked with each other.

Meanwhile, the third light source device 131 may be installed on a rear surface of the main bezel 230 facing the movement plate 240. That is, the first light source device 111 may be formed on a front surface of the main bezel 230, and the third light source device 131 may be installed on the rear surface of the main bezel 230.

Further, the third optical module 130 may further include a reflector 132. The reflector 132 may be installed in the movement plate 240 to reflect the light irradiated from the third light source device 131. For example, the reflector 132 may be formed in a curved shape to be curved in a direction toward the movement plate 240, but the shape of the reflector 132 is not limited thereto.

Further, the light reflected through the reflector 132 may be reflected through the rotation bezel 310. Here, the rotation bezel 310 may be coated with a reflective material to externally reflect the light reflected by the reflector 132. Here, the reflective material may be aluminum or the like that may reflect light.

For example, the reflective material may be deposited on the rear surface of the rotation bezel 310, and the rotation bezel 310 and the second substrate may be formed of a light-transmitting material. Accordingly, the light irradiated from the third light source device 131 may pass or extend through the second optical module 120 and be reflected by the rotation bezel 310. A space may be formed between the rotation bezel 310 and the main bezel 230 by the rotation of the rotation bezel 310 and the movement of the main bezel 230, and the light reflected by the rotation bezel 310 may be irradiated to the front side through the space. Further, the rear surface of the main bezel 230 facing the reflector 132 may be also coated with a reflective material. Accordingly, the light irradiated from the third light source device 131 and the light irradiated to the main bezel 230 through the reflector 132 may be reflected back to the reflector 132.

Meanwhile, the vehicle lamp 10 according to an embodiment of the present disclosure may further include a sub-bezel 700 on which the fourth optical module 140 is mounted. Further, the first base plate 500 may further include a bezel fixer 550 which is arranged between the hinge couplers 520 adjacent to each other and to which the sub-bezel 700 is fixed.

That is, the bezel fixer 550 may be formed to correspond to a location of the sub-bezel 700 and fastened to the sub-bezel 700 through bolt coupling, pin coupling, or the like. Accordingly, the sub-bezel 700 and the fourth optical module 140 coupled thereto may not undergo mechanical transformation such as rotation or movement. However, as described above, the fourth optical module 140 may convert the image in a static state.

In this way, in the vehicle lamp according to an embodiment of the present disclosure, the image of the entire light distribution pattern may be three-dimensionally and dynamically converted by the movement part and the driving part, and accordingly, lamp images having various designs may be implemented.

Further, according to the present disclosure, the total quantity of light may be increased as the light formed by the third optical module is added through location adjustment of the first optical module and the second optical module. Accordingly, in particular, visibility may be improved in bad weather to ensure vehicle stability.

Further, according to the present disclosure, since the movement part and the rod part are interlocked with each outer using one driving part, the driving part is minimized, and thus the manufacturing cost may be reduced, and the volume and weight may be reduced.

Further, according to the present disclosure, when the location of the second optical module is adjusted, since components having a rod structure are applied, the number of components is minimized, and thus the manufacturing cost may be reduced and the volume and weight may be reduced.

Although specific embodiments of the present disclosure have been described above, the spirit and scope of the present disclosure are not limited thereto, and those skilled in the art to which the present disclosure pertains may derive various modifications and changes without changing the subject matter of the present disclosure described in the appended claims.

What is claimed is:

1. A vehicle lamp comprising:
   a first optical module configured to generate a first light distribution pattern based on light irradiated from a first light source device;
   a second optical module configured to generate a second light distribution pattern based on light irradiated from a second light source device;
   a third optical module configured to generate a third light distribution pattern using light irradiated from a third light source device;
   a movement part connected to the first light source device and configured to move the first light source device;
   a rod part connected to the second light source device, interlocked with the movement part and configured to rotate the second light source device when the rod part is moved by the movement part; and
   a driving part configured to supply a driving force to the movement part and the rod part,
   wherein the vehicle lamp is configured to externally emit the light irradiated from the third light source device when the first light source device is moved and the second light source device is rotated.

2. The vehicle lamp of claim 1, wherein:
   the vehicle lamp is configured to generate a lamp image based on the first, second and third light distribution patterns, and
   the movement part and the rod part are configured to convert the lamp image.

3. The vehicle lamp of claim 2, wherein the lamp image includes:
   a first mode image generated based on the first and second light distribution patterns; and
   a second mode image generated based on the first, second and third light distribution patterns when the first light source device is moved and the second light source device is rotated.

4. The vehicle lamp of claim 1, wherein:
   the driving part includes a driving shaft configured to reciprocate when supplied with the driving force, and
   the movement part includes:
   a retainer coupled to the driving shaft;

a retainer holder having a first side coupled to the retainer and a second side;

a movement rod extending from the second side of the retainer and having a lengthwise direction corresponding to a central axis of the driving shaft;

a main bezel including the first light source device and coupled to the movement rod; and a movement plate spaced apart from a lower portion of the main bezel and having a through-hole through which the movement rod extends.

5. The vehicle lamp of claim 4, further comprising a first base plate disposed below the second light source device and including:

a body having a through-hole through which the movement rod extends;

a plurality of hinge couplers disposed along a circumference of the through-hole of the body; and a plurality of rod insertion grooves concavely disposed corresponding to the hinge couplers on a lateral side of the body.

6. The vehicle lamp of claim 5, further comprising a second base plate disposed below the movement plate and including:

a body having a through-hole through which the movement rod extends; and a plurality of rod couplers disposed along a circumference of the body of the second base plate.

7. The vehicle lamp of claim 6, wherein the retainer holder includes:

a body coupled to the retainer; and a presser extending in a horizontal direction along the circumference of the body of the retainer holder and configured to press the body of the second base plate upwardly when the driving shaft moves in a first direction.

8. The vehicle lamp of claim 7, wherein the rod part includes:

a rotation bezel hinge-coupled to the hinge coupler and rotatably mounted on the first base plate, wherein the second light source device is mounted on the rotation bezel; and a rod member having a first end hinge-coupled to the rotation bezel and a second end hinge-coupled to the rod coupler and extending into the rod insertion groove.

9. The vehicle lamp of claim 8, wherein:

the rotation bezel comprises a plurality of rotation bezels disposed along a circumference of the main bezel and has a plurality of rotation angles varied by the driving part, and a number of the rod members corresponds to that of the rotation bezels.

10. The vehicle lamp of claim 8, wherein:

the third light source device is disposed on a rear surface of the main bezel and facing the movement plate, and the third optical module further includes a reflector disposed at the movement plate and configured to reflect the light irradiated from the third light source device.

11. The vehicle lamp of claim 10, wherein:

the light reflected by the reflector is at least partially reflected by the rotation bezel, and the rotation bezel is coated with a reflective material configured to externally reflect the light reflected by the reflector.

12. The vehicle lamp of claim 5, further comprising:

a plurality of fourth optical modules disposed along a circumference of the first optical module and configured to generate a fourth light distribution pattern based on light irradiated from a fourth light source device; and a sub-bezel on which the plurality of fourth optical modules is mounted.

13. The vehicle lamp of claim 12, wherein the first base plate further includes a bezel fixer disposed between the hinge couplers disposed adjacent to each other and to which the sub-bezel is coupled.

* * * * *